May 21, 1940. N. M. McCULLOUGH 2,201,629
VEHICLE SPEED ENGINE CONTROL DEVICE
Filed Aug. 7, 1939
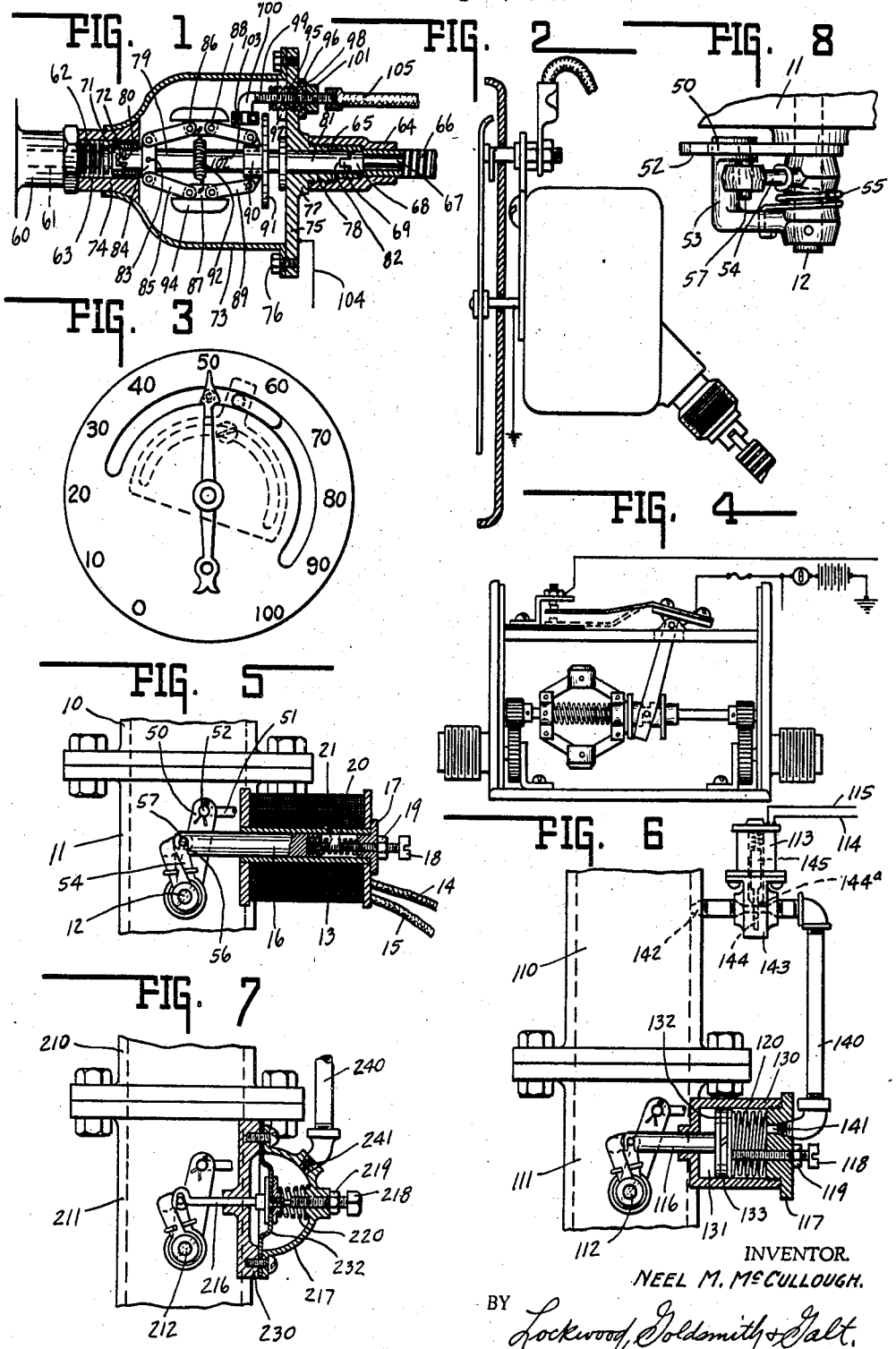
INVENTOR.
NEEL M. McCULLOUGH.
BY Lockwood, Goldsmith & Galt
ATTORNEYS.

Patented May 21, 1940

2,201,629

UNITED STATES PATENT OFFICE 2,201,629

VEHICLE SPEED ENGINE CONTROL DEVICE

Neel M. McCullough, Anderson, Ind., assignor to Pierce Governor Company, Anderson, Ind., a corporation Application August 7, 1939, Serial No. 288,732

9 Claims. (Cl. 180—82.1)

This invention relates to a fuel control system responsive primarily to vehicle speed for limiting the speed of an engine of a self-propelled vehicle to prevent overspeeding of the vehicle and more especially the control means for such vehicle regulation.

This application is a continuation-in-part of application Serial No. 91,213, filed July 17, 1936, and entitled "Vehicle speed engine limiting device," now Patent No. 2,169,267, dated August 15, 1939. This same invention is also disclosed in the copending applications Serial No. 100,650, filed September 14, 1936, entitled "Speedometer vehicle speed control device," now Patent No. 2,169,268, dated August 15, 1939, and is also disclosed in application Serial No. 180,497, filed December 18, 1937, entitled "Vehicle control and speed indicating system."

The present invention relates to a basic disclosure common to the three beforementioned applications. Each of the herein disclosed embodiments of the invention has the inherent characteristic that the control means is electrically operable or controlled and is responsive to the speed of the vehicle for controlling the speed of the engine of the vehicle, preferably by controlling the fuel supply valve, fuel supply lever, et cetera of the fuel supply system.

The chief object of the invention, therefore, as indicated by the foregoing, is to provide an electrical direct or remotely operable control for controlling engine operation to control vehicle speed of a vehicle provided with said engine to prevent vehicle overspeeding. In each of the embodiments of the invention the control is of electrical character, thereby differentiating from the copending non-electrical control disclosed and claimed in the copending Patent No. 2,142,403.

Other objects of the invention will appear more fully hereinafter in the following description.

The full nature of the invention will be understood from the accompanying drawing and the following description and claims:

In the drawing, Figure 1 is a central sectional view of a speedometer drive operable switch suitable for the purposes of the invention.

Figure 2 is a side elevation of a speedometer operable switch similarly suitable.

Figure 3 is a front elevation of such switch.

Figure 4 is a side elevation of another form of switch mechanism broadly similar to that shown in Figure 1.

Figure 5 is an elevational view, parts being broken away to show other parts in central section of a form of engine control responsive to any one of the foregoing speed controls.

Figure 6 is a view similar to Figure 5 and of a modified form of the invention.

Figure 7 is a view similar to Figures 5 and 6 and of another modified form of the invention.

Figure 8 is a plan view of the fuel valve lever arm actuating mechanism incorporated in the forms illustrated in Figures 5 to 7 inclusive.

In Figure 1 and Figure 4, there is illustrated a switch which is interposed in a speedometer drive and said switch, it is to be understood, is interposed in a circuit which is connected to a source of energy and which switch also is connected to a control device more particularly the subject matter of this invention, the latter control device in turn being connected by being grounded or directly connected to the source of energy. In view of the complete disclosure of said switches in applications Serial No. 91,213, now Patent No. 2,169,267 and Serial No. 180,497, no further description of these switches is believed necessary for an understanding of the present invention directed to the control device.

In like manner, Figure 2 and Figure 3 illustrate the speedometer addition switch fully disclosed and claimed in application Serial No. 100,650, now Patent No. 2,169,268 and no further description of the parts thereof need be set forth herein.

Reference will now be had to the direct and simplest form of the invention which is illustrated in Figure 5. In said Figure, 10 indicates the intake or fuel supply passage to an internal combustion engine; 11 an adapter type insert conventional to the art of fuel supply governors and in the same is mounted a shaft 12 which mounts a control valve not shown and which controls the flow or passage of fuel or rather the fuel mixture to the intake to the engine.

Suitably mounted on the adapter is a solenoid 13, line 14 of which it is to be understood is connected to any one of the switches aforementioned and illustrated in Figures 1 to 4 inclusive. Line 15 connects the solenoid to the source of supply or the ground. This solenoid slidably supports a core 16, the outer end of which is operatively associated with the shaft 12 of the fuel control valve in a manner hereinafter set forth or in any other convenient or desired manner. In the opposite end of the solenoid there is mounted a member 17 that threadedly receives a stop in the form of a screw bolt 18, the position of which is locked by a nut 19. Spring 20, concentric with this bolt and within the bore 21 of the solenoid, bears at one end against the member 17 and at the opposite end bears against the solenoid core, plunger or stem 16. This spring normally tends to move the plunger to a position corresponding to full open valve position. Upon energization of the solenoid, the core is attracted and tends to register with the solenoid in opposition to the spring 20. The registering position of the core is limited by the stop structure. Now if the switch be set for operation at a predetermined vehicle speed, then the plunger position under solenoid control may be limited by the adjustable stop structure to such a corresponding valve position that the engine receives a certain amount of fuel sufficient to permit the vehicle to operate just below the predetermined maximum speed. Of course, if the control is non-effective, that is the solenoid is not energized, this fuel control valve would normally be in the wide open position unless the operator, through the foot throttle or hand operable manual control, has moved this valve to a corresponding control position. The foregoing constitutes the electrically operated directly controlled embodiment of the invention.

Reference will now be had to Figure 6. In this figure, the numerals of the one hundred series indicate parts like, similar or comparable to those utilized in Figure 5 and indicated by similar basic numerals in said figure.

In this form of the invention, the adapter insert 111 mounts a body portion 130 provided with a bore forming a cylinder 131 in which is mounted a piston 132 provided with a ring structure 133 and carried by a stem 116 operatively connected to the valve supporting shaft 112 in a manner hereinafter to be described. The cylinder is closed by the head structure 117 which threadedly supports an adjusting screw bolt 118 the position of which is locked by the nut 119. Interposed between the head and the piston is a spring 120 which normally tends to force the piston and the valve into open valve position. Conduit 140 connects as at 141 to the head and thus communicates with the cylinder. The conduit 140 connects as at 142 to the intake 110 on the engine side of the fuel control valve so that this conduit is subject to suction created by the engine. Interposed in the conduit 140 is a valve structure 143 having a valve member 144 carried by a stem 145 which is in effect the core of a solenoid 113, the line 114 therefrom being adapted for connection to one of the switches beforementioned and the line 115 therefrom being adapted for connection to a source of energy or to a ground, if the source be grounded.

Upon the centrifugally operable switch completing the circuit to and through the solenoid, the valve 144, which normally is closed when the solenoid is deenergized, is, upon solenoid energization, positioned so that the suction or partial vacuum in the intake 110, which is applied at 142 to the line 140, is in turn applied to the cylinder 131 and serves to draw the piston toward the stop 118 in opposition to the spring 120 until said piston engages said stop. Thus, the actual power movement of the piston is effected by a variation in pressure and this is of the vacuum type and the pressure variation application is controlled by a valve, solenoid operable and therefore remotely controlled.

It, of course, is to be understood that whenever pressure is to be utilized in place of a partial vacuum as a source of power, as might be the case on vehicles equipped with air brakes wherein a source of air pressure is readily available, the conduit 140 instead of being connected at 142 to the intake would be connected to the source of pressure. Also, it will be perfectly obvious that when the solenoid is actuated the pressure would be supplied to the cylinder and to the opposite end of the same from that wherein the partial vacuum supply is applied so that the applied pressure then moves the piston to the right when the pressure supply control valve is open and such movement is in opposition to the spring.

Reference will now be had to Figure 7 wherein numerals of the two hundred series are used to designate like, similar or comparable parts. In brief, it may be said that this embodiment is substantially identical to that shown in Figure 6, except that in place of utilizing a cylinder and piston, there is utilized a diaphragm chamber and a diaphragm. Herein, 230 indicates the base of the diaphragm chamber suitably mounted on the adapter intake 211. It slidably supports the plunger or stem 216. The latter is rigid with a diaphragm 232 normally constrained to open valve position by the spring 220, said spring bearing against the inside face of the diaphragm chamber forming head number 217 which threadedly supports an adjustable stop member in the form of a screw bolt or the like 218 locked by the nut 219. The conduit 240 communicates as at 241 with the diaphragm chamber at one end and at the other end (not shown) communicates with the intake 210 on the engine side of the control valve arrangement and interposed in said conduit 240 is a solenoid valve structure (not shown) substantially identical to that shown in Figure 6 and similarly operable. Thus, upon solenoid actuation the vacuum control valve is opened and vacuum is applied to the diaphragm chamber and serves to move the diaphragm toward the stop in opposition to the spring thus moving the stem or plunger 216 for fuel valve control. It will be perfectly obvious that in a manner previously described with reference to the piston and cylinder modification that the diaphragm device may be reversed with reference to the parts and that the conduit 240 in place of connecting to a source of vacuum as illustrated for example in Figure 6 may be connected to a source of pressure and the supply of pressure to said conduit then will be controlled by the solenoid valve, as shown in Figure 6.

Reference will now be had to Figure 8. In this figure, numerals of the primary series will be employed. It is to be understood that this disclosure merely illustrates one embodiment of the connection of the control stem to the fuel control valve not shown. For simplicity, all the embodiments, to-wit: Figures 5, 6 and 7, illustrate the same type of operative connection and the like, and the same is illustrated in plan in Figure 8.

In Figures 5 and 8, the fuel controlling valve supporting shaft 12 projects outwardly beyond the adapter insert 11 and lever arm 50 is supported thereby, but not pinned or secured thereto and is operated in the usual manner by the manually operable control rod 51, see Fig. 5, connected thereto at 52. Shaft 12 has pinned to it at its outer end an angular stop 53. Between stop 53 and arm 50 is another arm 54 which is free on shaft 12 but is held against stop 53 by spring 55 as shown. Rod or stem 16 is notched as at 56 to receive pin 57 carried by arm 54.

When increased vehicle speed is desired, movement of arm 50, counter-clockwise, secures increased fuel supply because member 50 engages stop 53 and to this is secured shaft 12 carrying the fuel controlling valve not shown.

When the vehicle exceeds the predetermined speed for which the switch is set to operate, the rod or stem 16 is moved to the right carrying lever 54 with it, which moves, through spring 55, stop 53 to the right, and lever 50 moves therewith, to reduce the fuel supply. Thus, the overspeed control is inoperative for fuel control purposes at all speeds below the desired maximum vehicle speed, and at or above the critical maximum vehicle speed, the control is operative to insure reduction in fuel supply and prevent overspeeding. At the last mentioned speed the solenoid 13 is energized, the core and rod or stem 16 is moved into the position shown in Figure 5 and fuel valve (not shown) carried by shaft 12 reduces the fuel supply so that the engine can only operate up to a certain capacity which corresponds to that of the predetermined maximum vehicle speed under normal conditions of road operation of the vehicle. This limiting position of the fuel valve (not shown) is determined by adjustable stop 18.

The forms of the invention illustrated in Figures 5 to 8 relate to a direct or positive connection to a fuel throttle valve in an auxiliary valve housing and substantially the same means may be used to interpose a high speed control upon the carburetor throttle shaft, lever or throttle control rod without departing from the broad disclosure of these forms of the invention.

It is the intent, with the structures shown in Figures 5 to 8 inclusive, to limit the driver's control of the fuel intake to the position of the devices illustrated and which position has been determined to be the maximum vehicle speed desired when the vehicle is in high gear and travelling on level ground, the lever connecting spring being designed to give higher fuel intake capacity when the control means is relatively inoperative at lower vehicle speeds.

In the actuator disclosed in Fig. 1, the same is shown of electric circuit controlling type, although same broadly is not necessarily restricted thereto as will be apparent by referring to the disclosure in Patent No. 2,142,403, dated January 3, 1939.

In Fig. 1, there is illustrated a switch interposed in a speedometer drive. Herein, 60 indicates a portion of the vehicle and 61 a shaft constituting a part of the speedometer drive having a speed proportional to vehicle speed. Part 60 has a sleeve portion 62 threaded at 63 normally to receive the portion 64 complementarily threaded at 65, which portion is associated with tube 66 within which is mounted a shaft structure 67 terminating in a tongued drive member 68 having tongue 69.

Shaft 61 has the grooved end 71 with the groove 72 therein that receives tongue 69, as stated. Normally, these parts are detachably connected together in standard constructions, however, in the present instance a governor responsive device is interposed therebetween.

The governor responsive device of the present invention is of switch character and includes a housing 73 which terminates in a sleeve portion 74 interiorly threaded to receive the male threaded portion 62. The housing is closed by the plate 75 secured thereto as at 76. Plate 75 may be suitably supported and includes a bearing 77 which has an exteriorly threaded portion 78.

Shaft 79 is mounted in the housing and terminates in a tongue formed end 80 receivable by the groove 72 and an oppositely projecting grooved end 81, grooved as at 82 to receive the tongue 69 of the speedometer shaft driving member 68, or like member.

Pinned to shaft 79 as at 83 is a collar 84 and pivotally supported thereby are links 85 pivotally connected as at 86 to the members 87. Members 87 are also pivotally connected as at 88 to links 89 pivotally connected to a collar 90 which carries a plate 91. Collar 90 is longitudinally slidable relative to shaft 79. Spring means 92 normally constrains the two linkages, before mentioned, towards the shaft. Each member 87 carries a weight 94. The aforesaid constitutes one form of a centrifugally operable control device. As the speed of the shaft, which is proportionate to the speed of the vehicle, rises and falls, the plate 91 which rotates therewith, moves to the right—see Fig. 1—due to the effect of spring means 92 and moves to the left, in opposition to said spring means 92, in accordance with centrifugal force.

Plate 75 is apertured as at 95 and threaded. Insulated bushing 96 is screwed therein and is locked by the nut 97. Bushing 96 has a threaded aperture 98 adapted to adjustably mount an L-shaped member 99 having the angular extension 100. Lock nut 101 secures the L-shaped arm in adjusted position in the aperture, and maintains portion 100 in predetermined adjusted position relative to the normal position of plate 91 and in accordance with a predetermined vehicle speed.

To reduce the friction to a minimum, there is mounted on the end of the angular portion 100 a roller 102 and interposed therebetween is the ball bearing or similar anti-friction construction 103. When the predetermined vehicle speed is attained, plate 91 rotating in planes parallel to a plane transverse to the axis of the member 99, engages the roller 102 and not only contacts the same but rolls with it.

When the aforesaid construction is arranged as a switch, the line 105 and the line 104—taken with the lines 14 and 15 of Fig. 5—may be arranged in circuit formation, as shown in Fig. 1 of application Ser. No. 91,213, now Patent No. 2,169,267, dated August 15, 1939.

The basic construction, as previously described, may be of non-electrical character and arranged for valve actuation, as shown in Fig. 1 of Patent No. 2,142,403.

While the invention has been described in great detail in the foregoing specification, the same is to be considered as illustrative and not restrictive in character. Several forms of centrifugally operated and speedometer operated switches have been illustrated and any one or any other form may be readily employed or substituted. Several forms of the basic invention have been illustrated and described and other comparable forms have been described herein and are to be similarly considered.

These modifications, as well as others which readily suggest themselves to persons skilled in this art, are all considered to be within the scope of this invention, reference being had to the appended claims.

The invention claimed is:

1. In a device of the character described, the combination of a fuel supply throttle control member, a supporting shaft therefor, a manually operable lever rotatably supported thereby, a speed responsive lever also rotatably supported by the shaft, means carried by and rigid with the shaft and juxtapositioned relative to both levers and normally constrained to wide open throttle position, and a flexible connection between the second mentioned lever and the last mentioned means, the manually operable lever being capable of shaft movement by means of engagement with said last mentioned means and throughout the range of fuel control when the second mentioned lever is not responsive to speed control and said means is normally constrained, said manually operable lever being operable through a restricted and lesser range when the second mentioned lever is responsive to speed control and said means is positioned in opposition to its constraint.

2. In a device of the character described, the combination of a fuel supply throttle control member, a supporting shaft therefor, a manually operable lever rotatably supported thereby, a speed responsive lever also rotatably supported by the shaft, means carried by and rigid with the shaft and juxtapositioned relative to both levers and normally constrained to wide open throttle position, a flexible connection between the second mentioned lever and the last mentioned means, the manually operable lever being capable of shaft movement by means of engagement with said last mentioned means and throughout the range of fuel control when the second mentioned lever is not responsive to speed control and said means is normally constrained, said manually operable lever being operable through a restricted and lesser range when the second mentioned lever is responsive to speed control and said means is positioned in opposition to its constraint, and a solenoid controlled member connected to the speed responsive lever for actuating the same.

3. In a device of the character described, the combination of a fuel supply throttle control member, a supporting shaft therefor, a manually operable lever rotatably supported thereby, a speed responsive lever also rotatably supported by the shaft, means carried by and rigid with the shaft and juxtapositioned relative to both levers and normally constrained to wide open throttle position, a flexible connection between the second mentioned lever and the last mentioned means, the manually operable lever being capable of shaft movement by means of engagement with said last mentioned means and throughout the range of fuel control when the second mentioned lever is not responsive to speed control and said means is normally constrained, said manually operable lever being operable through a restricted and lesser range when the second mentioned lever is responsive to speed control and said means is positioned in opposition to its constraint, a solenoid controlled member connected to the speed responsive lever for actuating the same, adjustable means limiting the movement of the last mentioned member in one direction, and means normally constraining said last mentioned member in the opposite direction.

4. In a device of the character described, the combination of a fuel supply throttle control member, a supporting shaft therefor, a manually operable lever rotatably supported thereby, a speed responsive lever also rotatably supported by the shaft, means carried by and rigid with the shaft and juxtapositioned relative to both levers and normally constrained to wide open throttle position, a flexible connection between the second mentioned lever and the last mentioned means, the manually operable lever being capable of shaft movement by means of engagement with said last mentioned means and throughout the range of fuel control when the second mentioned lever is not responsive to speed control and said means is normally constrained, said manually operable lever being operable through a restricted and lesser range when the second mentioned lever is responsive to speed control and said means is positioned in opposition to its constraint, and means connected to the speed responsive lever for actuating the same and operable by variation in pressure applied thereto.

5. A device as defined by claim 4, characterized by the pressure variation being of the vacuum application type.

6. A device as defined by claim 4, characterized by the last mentioned means being of piston type.

7. A device as defined by claim 4, characterized by the last mentioned means being of diaphragm type.

8. A device as defined by claim 4, characterized by the pressure variation being of the vacuum application type, and by the last mentioned means being of piston type.

9. A device as defined by claim 4, characterized by the pressure variation being of the vacuum application type, and by the last mentioned means being of diaphragm type.

NEEL M. McCULLOUGH.